(12) United States Patent
Chan et al.

(10) Patent No.: US 9,313,092 B2
(45) Date of Patent: Apr. 12, 2016

(54) METHOD AND APPARATUS FOR MANAGING IDENTIFIERS OF A MULTIPLE WANS NETWORK DEVICE

(75) Inventors: Alex Wing Hong Chan, Hong Kong (HK); Kit Wai Chau, Hong Kong (HK); Yu Yeung, Hong Kong (HK)

(73) Assignee: PISMO LABS TECHNOLOGY LIMITED, Hong Kong (HK)

( * ) Notice: Subject to any disclaimer, the term of this patent is extended or adjusted under 35 U.S.C. 154(b) by 0 days.

(21) Appl. No.: 13/979,374

(22) PCT Filed: Mar. 2, 2012

(86) PCT No.: PCT/IB2012/050983
§ 371 (c)(1),
(2), (4) Date: Apr. 8, 2014

(87) PCT Pub. No.: WO2013/128242
PCT Pub. Date: Sep. 6, 2013

(65) Prior Publication Data
US 2015/0131430 A1  May 14, 2015

(51) Int. Cl.
*H04L 12/24* (2006.01)
*H04W 76/06* (2009.01)
(Continued)

(52) U.S. Cl.
CPC ........ *H04L 41/0659* (2013.01); *H04L 41/0668* (2013.01); *H04L 43/0817* (2013.01);
(Continued)

(58) Field of Classification Search
CPC ..... H04W 24/02; H04W 48/00; H04W 76/00; H04W 76/064; H04W 24/04; H04W 76/06; H04W 76/068; H04W 84/12; H04W 28/02; H04L 41/0659; H04L 41/0668; H04L 43/0817

USPC ........................................... 370/217
See application file for complete search history.

(56) References Cited

U.S. PATENT DOCUMENTS 6,882,653 B1 * 4/2005 Kiuchi et al. ............... 370/401
7,187,920 B2    3/2007 Tsutsui
(Continued)

FOREIGN PATENT DOCUMENTS

CN    101389079 A    3/2009
CN    101437234 A    5/2009
(Continued)

OTHER PUBLICATIONS

International Search Report in International Application No. PCT/IB2012/050983, mailed on Dec. 6, 2012.
(Continued)

*Primary Examiner* — Un C Cho
*Assistant Examiner* — Shah Rahman (57) ABSTRACT

The method and apparatus of the present invention concern the enablement and disablement of at least one identifier of a network device, which is capable of allowing connecting to a plurality of wide area network (WAN) connections through at least one wireless local area (WLAN) network connection. When a first WAN network connection does not meet at least one condition, the at least one corresponding identifier of said first WAN network connection are disabled and other identifiers not corresponding to said first WAN network connection are not affected. When first WAN network connection meets all said conditions again, said at least one corresponding identifier of said first WAN network connection are enabled again.

18 Claims, 3 Drawing Sheets

(51) Int. Cl.
*H04L 12/26* (2006.01)
*H04W 24/04* (2009.01)
*H04W 28/02* (2009.01)
*H04W 84/12* (2009.01)

(52) U.S. Cl.
CPC .............. *H04W24/04* (2013.01); *H04W 76/06* (2013.01); *H04W 76/064* (2013.01); *H04W 76/068* (2013.01); *H04W 28/02* (2013.01); *H04W 84/12* (2013.01)

(56) References Cited

U.S. PATENT DOCUMENTS

| | | | | |
|---|---|---|---|---|
| 7,346,338 | B1 * | 3/2008 | Calhoun et al. | 455/411 |
| 7,821,929 | B2 * | 10/2010 | DelRegno et al. | 370/230 |
| 2005/0102443 | A1 * | 5/2005 | Mahany et al. | 710/18 |
| 2005/0233693 | A1 * | 10/2005 | Karaoguz et al. | 455/3.06 |
| 2006/0227725 | A1 * | 10/2006 | Huotari | H04L 41/082 370/254 |
| 2007/0064634 | A1 * | 3/2007 | Huotari | H04W 48/20 370/310 |
| 2007/0183401 | A1 * | 8/2007 | Bennett | 370/352 |
| 2008/0076411 | A1 * | 3/2008 | Khetawat et al. | 455/432.1 |
| 2008/0285483 | A1 * | 11/2008 | Gil et al. | 370/254 |
| 2009/0129386 | A1 * | 5/2009 | Rune | H04L 12/2881 370/392 |
| 2010/0165832 | A1 * | 7/2010 | Kini et al. | 370/217 |
| 2010/0177632 | A1 * | 7/2010 | Tarnanen | 370/225 |
| 2011/0082933 | A1 * | 4/2011 | Zhou | H04L 69/08 709/225 |
| 2011/0085447 | A1 * | 4/2011 | Kholaif et al. | 370/242 |
| 2011/0219334 | A1 * | 9/2011 | Park | 715/808 |
| 2013/0102313 | A1 * | 4/2013 | Tinnakornsri-suphap | H04W 36/22 455/436 |

FOREIGN PATENT DOCUMENTS

| | | | | |
|---|---|---|---|---|
| EP | 1475930 | A2 * | 11/2004 | H04L 12/66 |
| JP | 2010074335 | A * | 4/2010 | H04W 48/18 |

OTHER PUBLICATIONS

Written opinion of the International Searching Authority in International Application No. PCT/IB2012/050983, mailed on Dec. 6, 2012.

* cited by examiner

METHOD AND APPARATUS FOR MANAGING IDENTIFIERS OF A MULTIPLE WANS NETWORK DEVICE

BACKGROUND

Identifier, such as service set identifier (SSID), is used to allow hosts to connect to a network device, such as wireless access point (AP). The network device has more than one identifier. In some network configurations, hosts associated with the network device through the identifier are in the same local area network (LAN) and hosts associated with the network device through different identifiers are in different LANs. In some network configurations, hosts associated with the network device are in the same LAN regardless of the identifiers being used. Moreover, for each identifier it is possible to establish a standalone authentication and encryption scheme (plain-text, WPA-PSK, WPA Enterprise or WEP at 128 bits). Administrators of network device have also been using identifiers as advertising messages.

However, when there are a plurality of wide area network (WAN) connections and a plurality of identifiers, the management of identifiers become complicated, especially if the WAN network connections are not stable.

FIELD OF INVENTION

The method and apparatus of the present invention concern the management of network device, more specifically to the enablement and disablement of at least one identifier of a network device, which is capable of allowing connecting to a plurality of wide area network (WAN) connections through at least one wireless local area (WLAN) network connection.

BRIEF DESCRIPTION OF THE DRAWINGS

The present invention is illustrated by way of example, and not by way of limitation.

DETAILED DESCRIPTION

The following detailed description illustrates exemplary embodiments in details to enable one of skill in the art to practice the invention.

SUMMARY OF THE INVENTION

The present invention solves the problems of the prior art by disabling of one or more corresponding identifier when a wide area network (WAN) network connection does not meet at least one condition. When the WAN network connection meets all conditions again, corresponding disabled identifiers will then be enabled.
Corresponding Identifiers An identifier is a string used to identify one WLAN network connection. A WLAN interface may be implemented by a standalone electronic component or may be integrated with other electronic components. One WLAN interface may have no WLAN network connection or at least one network connection depending on the configuration. One WLAN network connection may have no identifier, one identifier only or a plurality of identifiers. The identifier may be broadcast or not. Hosts that try to connect to the WLAN network connection may use an identifier and satisfy the security profile associated with the identifier.

Figure 1:
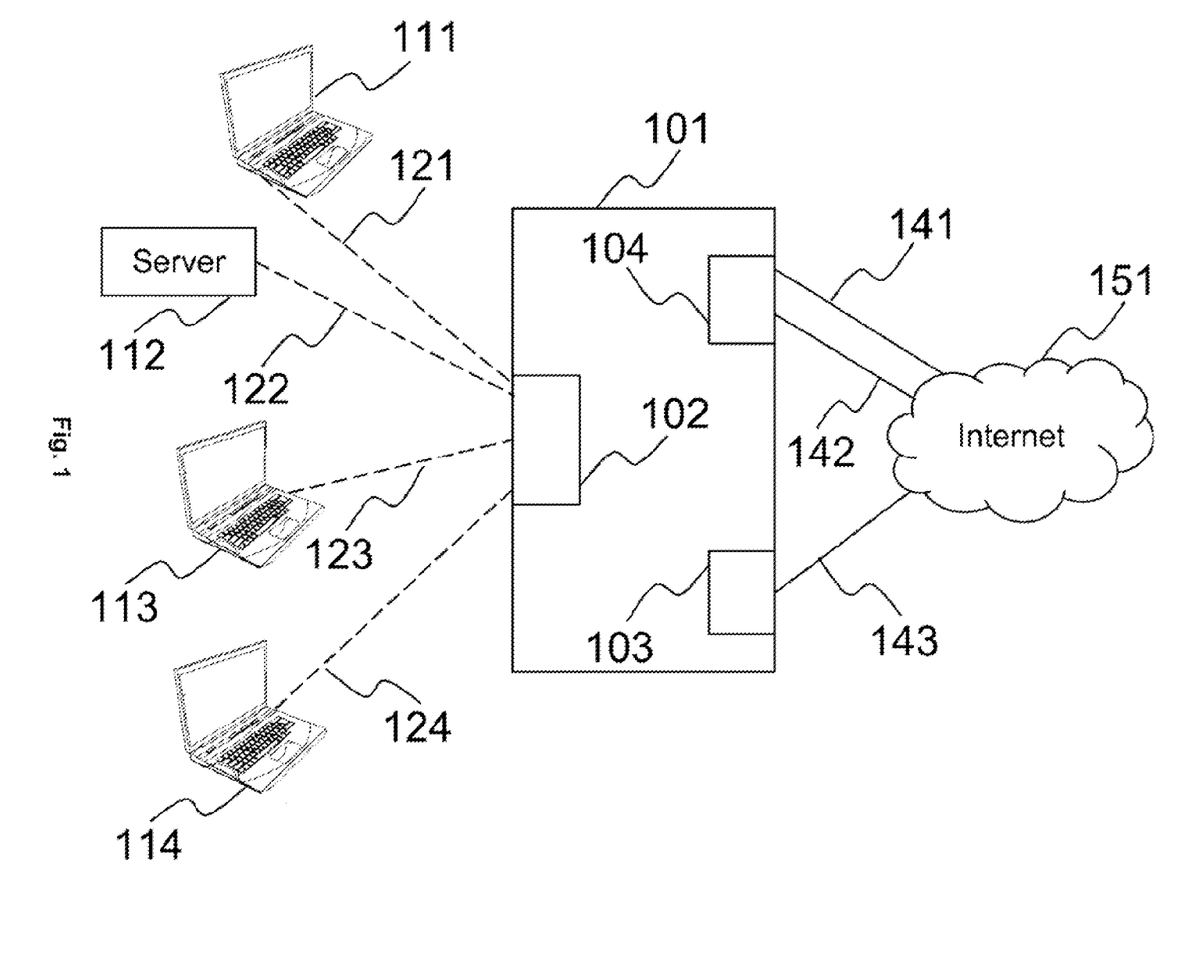
FIG. 1 illustrates a network environment in which hosts, such as computer clients and network device clients, may connect to the network device embodiments of the present invention may be implemented.

FIG. 1 illustrates a computer network environment including one of the embodiments of the present invention. In FIG. 1 the computer network environment comprises a plurality of host nodes, such as client computers 111, 113 and 114 and server 112, connecting to network device 101 through WLAN interface 102 and wireless connections 121, 123, 124 and 122 respectively. WLAN interface 102 may be implemented using a WLAN adapter or be part of circuitry of another electronic component inside network device 101. WLAN interface has the WLAN network connections 121, 122, 123 and 124. For illustrative purpose, WLAN network connections 121 and 122 are associated with a first identifier. WLAN network connection 123 is associated with a second identifier. WLAN network connection 124 is associated with a third identifier. Therefore, a single WLAN interface may have no identifier or at least one identifier.

According to one of the embodiments of present invention, each identifier corresponds with one WAN network connection. For illustrative purpose, network traffic sent to the Internet 151 and/or received from the Internet 151 through said first identifier uses WAN network connection 141, network traffic sent to the Internet 151 and/or received from the Internet 151 through said second identifier uses WAN network connection 142, and network traffic sent to the Internet 151 and/or received from the Internet 151 through said third identifier uses WAN network connection 143. A WAN network connection may be a virtual private network (VPN) between two network devices, part of a virtual VPN, a tunnel using OSI layer 2 protocol, a tunnel using OSI layer 3 protocol, a tunnel using Layer 2 Tunneling Protocol (L2TP), a Transmission Control Protocol (TCP) connection, a virtual local area network (VLAN), an Ethernet connection, and any other networking technologies for connecting a plurality of electronic devices.

According to one of the embodiments of present invention, a WAN network connection may comprise of a plurality of WAN network connections (Aggregated WAN Network Connection) using network aggregation technique, network bonding technique, OSI layer 2 VPN bonding technique, OSI layer 3 VPN bonding technique, load balancing technique, etc. An Aggregated WAN Network Connection is also considered as a WAN network connection because from client computer¡s perspective, the Aggregated WAN Network Connection is providing network connectivity as a WAN network connection. An identifier may correspond to the Aggregated WAN Network Connection. For illustrative purpose, network traffic sent to the Internet 151 through said first identifier may use any of WAN network connection 141, 142 or 143. Therefore, a first and a second Internet Protocol (IP) packet sent by client computer 111 may go through WAN network connections 141 and 143 respectively. Similarly, network traffic designated to client computer 111 through said first identifier may use any of WAN network connection 141, 142 or 143. Therefore, a first IP packet and a second IP packet received from the Internet 151 may go through WAN network connections 141 and 143 respectively.

WAN interfaces 103 and 104 allow network device 101 to transmit and receive network traffic over WAN network connections. For illustrative purpose, WAN interface 104 has two WAN network connections 141 and 142 and WAN interface 103 has one WAN network connections 143. WAN network connections 141, 142, 143 connect network device 101 to the Internet.

Therefore, an identifier associated with a WLAN network connection may correspond to no or at least one WAN network connection. From another perspective, a WAN network connection may have none or at least one corresponding identifier, which is associated with at least one WLAN network connection.

When an identifier is disabled, no WLAN network connection can be established with the network device using the identifier, regardless if the identifier is still be broadcast.

According to one of the embodiments of present invention, the WLAN network connection is IEEE 802.11 standard and the identifier is service set identifier (SSID) defined in IEEE 802.11 standard.

According to one of the embodiments of the present invention, a WAN network connection may be a wired or wireless network connection.

According to one of the embodiments of the present invention, a WAN interface that may be provided by the network device (ND) is an Ethernet interface, a frame relay interface, a fiber optic interface, a cable interface, a DSL interface, a token ring interface, a serial bus interface, an universal serial bus (USB) interface, Firewire interface, Peripheral Component Interconnect (PCI) interface, etc. Generally, the WAN interface may include port appropriate for communication with the appropriate media. The WAN interface or/and WAN port may connect to a wireless communication modem, such as WiMAX modem, Wi-Fi modem, 802.11 modem, GSM modem, CDMA modem, HSPA modem, HSDPA modem, Long Term Evolution (LTE) modem, etc. Those of skilled in the art will readily appreciate other approaches to have WAN network connection using different types of WAN interfaces.

According to one of the embodiments of the present invention, the ND may support mixed types of WAN network connections. For illustrative purpose, one of WAN network connections of a ND is a wired network connection using an Ethernet interface connecting to a cable carrying Ethernet traffic and another WAN network connection of the ND is a wireless network connection using an USB interface connecting a WiMAX modem carrying Internet Protocol (IP) traffic.

According to one of the embodiments of the present invention, the wireless LAN interface includes IEEE 802.11a, IEEE 802.11b, IEEE 802.11g, IEEE 802.11n, IEEE 802.11ac, IEEE 802.11s, IEEE 802.11ad, ZigBee, Bluetooth, and etc. Those of skilled in the art will readily appreciate other approaches to have wireless LAN connection using different types of wireless LAN interfaces.

Monitor Network Connections

Common techniques for monitoring network connections, including wide area network (WAN) network connection and local area network (LAN) network connection) may include response time, latency, availability and/or uptime in one or more OSI network layers, such as the physical layer, networking layer, transport layer, session layer and application, using a network technology, such as Ethernet, Internet Protocol, WiMAX, Long Term Evolution (LTE), 3GPP, and etc., and using one or more network protocols, such as HTTP, HTTPS, SNMP, FTP, SMTP, POP3, IMAP, DNS, SSH, TELNET, SSL, TCP, ICMP, SIP, and UDP. The time period between two consecutive monitoring of a network connection, such as a WAN network connection and WLAN network connection, may be a random time period, defined according to a formula or pre-determined by a network administrator or network device manufacturer.

One of the common techniques for monitoring network connections is to periodically use ICMP in one of the WAN network connections to ping an external host located at an external network, such as the Internet, in order to monitor whether the WAN network connection is available. The external host may be an external Internet host, computing device, network device, router, and server. Another common technique is to periodically measure the time and/or latency to download or upload, using HTTP, FTP, HTTPS, SFTP or other protocols, a file at a server located at the WAN, such as the Internet, in order to monitor if the bandwidth and/or latency is satisfactory. Those of skilled in the art will readily appreciate other approaches to monitor a network connection.

The WAN network connection monitoring results may then be used to compare against at least one condition to determine whether a particular WAN network connection has not satisfied the desired network performance and become a failed WAN network connection (FWC). According to one of the embodiments of present invention, a pre-defined download time of a pre-defined website content or a file, is a condition. If the time required downloading the website content or the file using a particular WAN network connection is longer than a condition, say five seconds, then the particular WAN network connection is a considered to be a FWC. In one variant, if the round-trip time monitored after pinging a server using a particular WAN network connection is longer than a condition, say one hundred milliseconds, the particular WAN network connection is considered as a FWC. Those of skilled in the art will readily appreciate other approaches to determine a WAN network connection has failed to meet a condition and how to determine the value of a condition.

According to one of the embodiments of present invention, a condition may be a combination of different selected WAN network connection monitoring results. A condition is not met when all the selected WAN network connection monitoring results do not meet their respective thresholds and then the WAN network connection becomes a FWC. On the other hand, the condition is still being met if not all the selected WAN network connection monitoring results fail to meet their respective thresholds and the WAN network connection is then not considered to be a FWC. For illustrative purpose, a condition is a combination of the speed of uploading a predefined file to a pre-defined website higher than a pre-define speed and the round-trip time for a message reaching a server is shorter than a threshold. A WAN network connection is considered to be a FWC if the speed of uploading the pre-defined file to the pre-defined website lower than the pre-define speed and the round-trip time for the message reaching the server is longer than the threshold. On the other hand, the WAN network connection is not considered as a FWC if the speed of uploading the predefined file to the pre-defined website lower than the pre-defined speed but the round-trip time for the message reaching the server is shorter than the threshold. Those of skilled in the art will readily appreciate other approaches to determine a WAN network connection has failed to meet a condition when the condition is created by using a plurality of thresholds.

According to one of the embodiments of present invention, a condition may be a logical operation performed on WAN network connection monitoring results observed in an Aggregated WAN Network Connection. A condition is not met when all WAN network connection monitoring results observed in an Aggregated WAN Network Connection do not meet a threshold. For illustrative purpose, an Aggregated WAN Network Connection is considered to be a FWC if the round-trip times for a message reaching a server in all WAN network connections belonging to the Aggregated WAN Network Connection are all longer than a threshold. However, as long as the round-trip time in one of the WAN network connections is below the threshold, the Aggregated WAN Network Connection is not considered to be a FWC. For illustrative purpose, an Aggregated WAN Network Connection is considered to be a FWC if the average percentage of packet loss in the Aggregated WAN Network Connection is higher than a threshold. It is possible that the Aggregated WAN Network Connection is not considered to be a FWC even one of the WAN network connections belonging to the Aggregated WAN Network Connection has average packet loss percentage than the threshold because the average packet loss percentage of the Aggregated WAN Network Connection is still below the threshold.

Method

Figure 2:
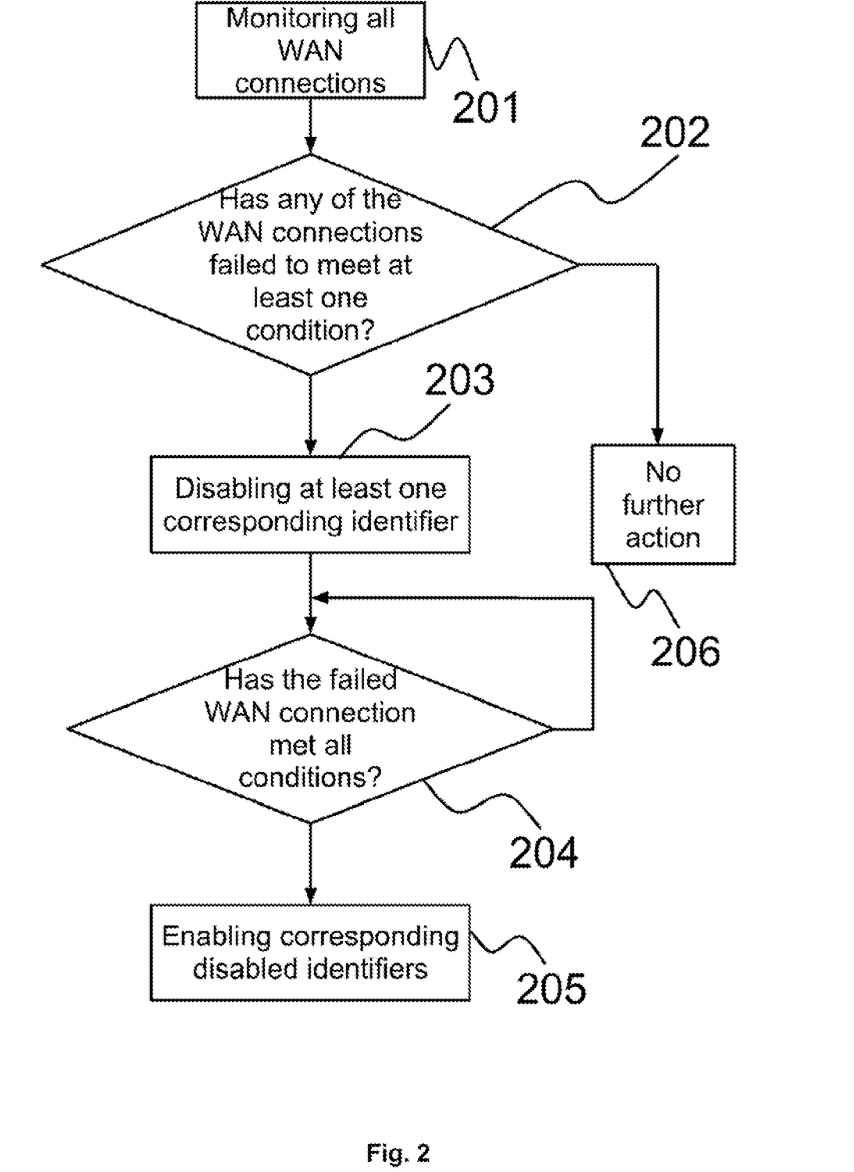
FIG. 2 is a flow chart illustrating the disablement and enablement of at least one corresponding identifier in accordance with one embodiment of the present invention.

FIG. 2 is a flow chart illustrating the steps of one of the embodiments of present invention to manage identifier assignment for a ND with a plurality of WAN connections. The ND has a plurality of WAN interfaces and each WAN interface has at least one WAN network connection. At step 201, the ND monitors all WAN network connections.

At step 202, the ND determines whether any of the WAN network connections has failed to meet one of conditions. According to one of the embodiments of present invention, when at least one condition has not been met, the ND then determines that the particular WAN network connection is a FWC regardless whether other conditions have been met. Those of skilled in the art will readily appreciate other approaches to determine a WAN network connection has failed to meet a condition and how to determine the value of a condition.

If all WAN network connections satisfy all conditions, step 206 is executed such that no action will be performed to any of the identifiers.

At step 203, the ND disables one or more identifiers, which are corresponding to the FWC. A WAN network connection may have one or multiple identifiers. An identifier may correspond to no WAN network connection, one or more WAN network connections. When an identifier only corresponds to one WAN network connection, network traffic belong to the WAN network connection is associated with the identifier. When an identifier corresponds to one or more WAN network connections, network traffic associated with the identifier may belong to one or more WAN network connections. When a WAN network connection has a plurality of corresponding identifiers, network traffic going through the network connection may belong to one of the plurality of identifiers. Therefore, when the WAN network connection becomes a FWC, at least one corresponding identifiers are disabled and non-corresponding identifiers are not affected. The decision to disable which of the corresponding identifiers is based on policy set by the administrator of the ND or the manufacturer of the ND. According to one of the embodiments of the present invention, when the WAN network connection becomes a FWC, all corresponding identifiers are disabled and non-corresponding identifiers are not affected.

At step 204, the ND checks whether the FWC has satisfied all conditions. The time period between the checking may be random, pre-defined or according to an algorithm. According to one of the embodiments of the present invention, the time period may range from one millisecond to five minutes. When the FWC has met all conditions, corresponding disabled at least one identifier is then enabled at step 205 and hosts can then use the WAN network connection, the previous FWC, by using one of the corresponding identifiers and the ND. If the FWC has still not met all the conditions, hosts still cannot use the disabled corresponding identifiers to connect to the ND and cannot use the FWC.

According to one of the embodiments of the present invention, an identifier is a service set identifier (SSID) specified in IEEE 802.11 standards, a ND is an wireless access point (AP) and one of the WAN network connections of the AP has a plurality of corresponding SSIDs. An 802.11 AP in an exemplary embodiment may have two WAN interfaces, WAN-A and WAN-B and one WLAN interface. The AP may have five SSIDs, three of the SSIDs, namely SSID-A, SSID-B and SSID-C corresponding to WAN-A, and two of the SSIDs, namely SSID-D and SSID-E corresponding to WAN-B. Hosts may connect to the Internet by firstly connecting to the WLAN of the AP through one of the five SSIDs and then through WAN-A or WAN-B. Again, using FIG. 2 as an illustrative example, the AP periodically monitors WAN-A and WAN-B at step 201. If WAN-A becomes a FWC at step 202, SSID-A, SSID-B and SSID-C will then be disabled at step 203 and hosts using SSID-A, SSID-B and SSID-C will not be able to communicate with the AP and not able to connect to the Internet. In one variant, if WAN-A becomes a FWC at step 202, at least one of SSID-A, SSID-B and SSID-C will then be disabled at step 203 and hosts using the disabled at least one SSID will not be able to communicate with the AP and not able to connect to the Internet. The AP then monitors whether WAN-A has met all conditions as at step 204. When WAN-A has satisfied all the conditions again, SSID-A, SSID-B and SSID-C will be enabled at step 205 and hosts may use one of SSID-A, SSID-B and SSID-C to connect to the AP and to connect to the Internet through WAN-A.

According to one of the embodiments of the present invention, when the ND has determined a WAN network connection has failed to meet at least one condition at step 202 and become a FWC, step 203 is immediately performed.

According to one of the embodiments of the present invention, when the ND has determined a WAN network connection has failed to meet one of conditions at step 202 and become a FWC, step 203 is performed after a pre-defined time and allowing the ND to respond to request received through at least one corresponding identifier with a message. The purpose of responding with a message is to inform users and/or hosts that the at least one corresponding identifier are soon to be disabled. The reason to send message to respond to request, instead of sending message without receiving request, is to limit the proliferation of network traffic and maintain security. The message may be a string, an article, a paragraph, a binary file, a picture, a video, an audio message, a song, a web page, a SMS, an instant message, etc. The message may be sent using HTTP, HTTPS, SNMP, FTP, and etc. According to one of the embodiments of the present invention, the message may inform users and hosts about other available identifiers to use. Those of skilled in the art will readily appreciate other approaches to send the message and the contents of the message. The pre-defined time may last from 1 millisecond to days as the purpose is to allow users and hosts to have adequate time to decide what to do before the disablement of at least one corresponding identifier.

According to one of the embodiments of the present invention, when step 205 is performed, the ND may also broadcast the at least one corresponding identifier. This allows users and hosts to be aware that the FWC has satisfied all conditions again through the at least one corresponding identifier. According to one of the embodiments of the present invention, when step 205 is performed, the ND may not broadcast the at least one corresponding identifier, such as not broadcasting SSIDs under 802.11 standard.

Apparatus

Figure 3:
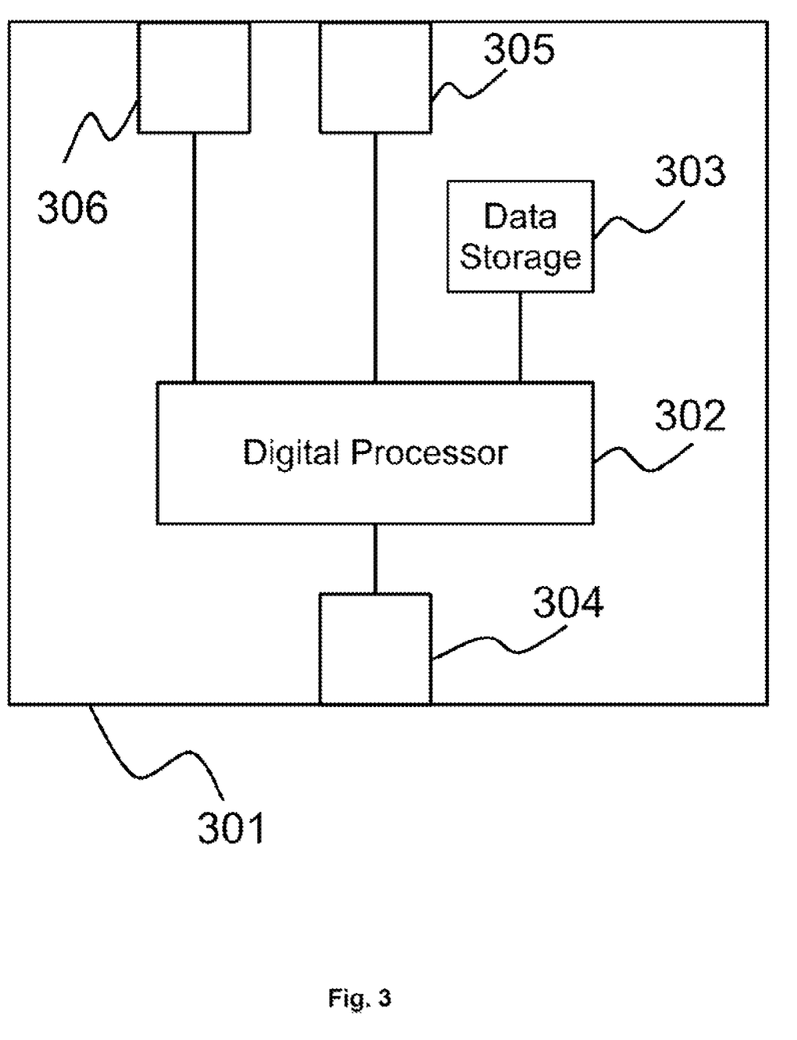
FIG. 3 illustrates an example wireless communication apparatus suitable for implementing embodiments of the present invention.

FIG. 3 illustrates one of the embodiments of present invention of a network device with the capability to manage identifiers according to the present invention described. The network device 301 comprises a digital processor(s) 302, a data storage 303, at least one WLAN interfaces 304, and a plurality of WAN interfaces, such as a first WAN interface 305 and a second WAN interface 306, for use with other network apparatus such as Ethernet switches, IP routers and other packet network devices, network management and provisioning systems, local PCs, etc. Other components which may be utilized within the network device 301 include amplifiers, board level electronic components, as well as media processors and other specialized SoC or ASIC devices. Support for various processing layers and protocols (e.g., 802.3, DOCSIS MAC, DHCP, SNMP, H.323/RTP/RTCP, VoIP, SIP, etc.) may also be provided as required.

Network device 301 may take any number of physical forms, comprising for example one of a plurality of discrete modules or cards within a larger network edge or hub device of the type well known in the art and may also comprise firmware, either alone or in combination with other hardware/software components. Alternatively, network device 301 may be a stand-alone device or module disposed at other computing device or network device, and may even include its own RF front end (e.g., modulators, encryptors, etc.) or optical interface so as to interface directly with other computing devices and network devices. Numerous other configurations may be used. Network device 301 may also be integrated with other types of components (such as mobile base stations, satellite transceivers, video set-top box, encoders/decoders, etc.) and form factors if desired.

Digital processor(s) 302 may be implemented by using one or more central processing units, network processors, microprocessors, micro-controllers, FPGAs, ASICs or any device capable of performing instructions to perform the basic arithmetical, logical, and input/output operations of the system.

Data storage 303 may be implemented by using at least one DRAM, SDRAM, Flash RAM, optical memory, magnetic memory, hard disk, and/or any computer readable media that are able to provide data storage capability. Data storage 303 may be used to provide instructions to digital processor 302 and to provide data storage to store identifiers, conditions, thresholds, network performance statistics, web pages, messages and other data to facilitate the operation of the ND and the monitoring of WAN network connections.

A plurality of WAN interfaces at the network device 301, such as WAN interface 305 and 306, may be implemented using serial bus, universal serial bus (USB), parallel bus, a universal asynchronous receiver/transmitter (UART), Peripheral Component Interconnect (PCI) local bus, VESA local bus, Industry Standard Architecture (ISA) bus, I2C, Serial Peripheral Interface Bus, or other electronic components connecting technology to connect digital processor 302 and an agent, which is used to be connected with optical fiber, cables, or antenna. In one variant, at least one WAN interface is in the digital processor 302 and therefore the agent for connecting with optical fiber, cables or antenna may directly connect with the digital processor 302. In one variant, at least one WAN interface may connect to an Ethernet port for Ethernet WAN network connection. In one variant, at least one WAN interface may connect to an Wi-Fi adapter for Wi-Fi network connection. In one variant, at least one WAN interface may connect to a USB port and the USB port may connect to an external modem for wireless WAN connection, such as a USB 3G modem, USB LTE modem, USB WiMAX Modem, USB Wi-Fi Modem, or other modem for wireless communications.

In one variant, all WAN interfaces connect a plurality of USB ports for external modem connections. In one variant, all WAN interfaces connect to circuitry inside network device 301. Myriad other combinations and permutations of the foregoing will be appreciated by those of ordinary skill given the present disclosure.

At least one WLAN interface at the network device 301, such as WLAN interface 304, may be implemented using serial bus, universal serial bus (USB) parallel bus, a universal asynchronous receiver/transmitter (UART), Peripheral Component Interconnect (PCI), local bus, or other electronic components connecting technology to connect digital processor 302 and an agent, which is used to be connected with antenna or antennae. In one variant, at least one WLAN interface is in the digital processor 302 and therefore the agent for connecting with antenna or antennae may directly connect with the digital processor 302. In one variant, at least one WLAN interface may connect to a Wi-Fi adapter for Wi-Fi network connection. In one variant, at least one WLAN interface may connect a USB port and the USB port may connect to an external modem for WLAN connection, such as USB Wi-Fi Modem, Femtocell, or other modem for WLAN communications. In one variant, all WLAN interfaces connect to circuitry inside network device 301. Myriad other combinations and permutations of the foregoing will be appreciated by those of ordinary skill given the present disclosure.

Digital processor 302 monitors all WAN network connections, including Aggregated WAN Network Connection, by examining network packets passing through WAN network connections, which are carried by WAN interfaces 305 and 306. Digital processor 302 also determines whether a WAN network connection meet or does not meet a condition. When digital processor 302 determines that a monitoring result does not satisfy a condition, which is retrieved from data storage 303, digital processor 302 then determines that the WAN network connection becomes a FWC and corresponding identifiers are disabled by process 302.

When a WAN network connection has a plurality of corresponding identifiers, network traffic going through the network connection may belong to one of the plurality of identifiers; and therefore when the WAN network connection becomes a FWC, at least one corresponding identifiers are disabled by digital processor 302. The decision, implemented by digital processor 302, to disable which of the corresponding identifiers is based on policy, which is stored at data storage 303, set by the administrator of the ND or the manufacturer of the ND. According to one of the embodiments of the present invention, when the WAN network connection becomes a FWC, all corresponding identifiers are disabled by digital processor 302. Other identifiers not corresponding to the FWC are not affected when digital processor 302 has determined that the FWC has failed to meet one of the conditions.

Commonly measured metrics for monitoring WAN network connections may include response time, latency, availability and/or uptime in one or more OSI network layers, such as physical layer, networking layer, transport layer, session layer and application, using a network technology, such as Ethernet, Internet Protocol, WiMAX, LTE, 3GPP, and etc., and using one or more network protocols, such as HTTP, HTTPS, SNMP, FTP, SMTP, POP3, IMAP, DNS, SSH, TELNET, SSL, TCP, ICMP, SIP, and UDP. The time period between two consecutive WAN network connection monitors can be a random time period, defined according to a formula or pre-determined by a network administrator or ND manufacturer. According to one of the embodiments of present invention, the time period may range from one millisecond to one hour. According to one of the embodiments of present invention, digital processor 302 periodically uses ICMP in one of the WAN network connections to ping a server in order to monitor whether the WAN network connection is available. Those of skilled in the art will readily appreciate other approaches to monitor a WAN network connection.

WAN network connection monitoring results, conditions, pre-defined conditions, thresholds, pre-defined thresholds, messages and web pages may be stored in data storage 303 for digital processor 302 to process. Data storage 303 may also be used as a buffer for network traffic received or to be delivered for WAN network connections and/or WLAN network connections.

Digital processor 302 periodically checks whether the FWC has met all conditions and can determine that the FWC is not a FWC anymore. The time period between the checking may be random, pre-defined or according to an algorithm. When the FWC has met all conditions, corresponding disabled at least one identifier is then enabled by digital processor 302 and hosts can then use the previously FWC by using one of the corresponding identifiers.

According to one of the embodiments of the present invention, network device 301 is a wireless access point that supports IEEE 802.11 standards and the identifier is a service set identifier (SSID). WLAN interfaces 304 supports IEEE 802.11 standards.

According to one of the embodiments of the present invention, when the digital processor 302 has determined a WAN network connection has failed to meet one of conditions and become a FWC, at least one corresponding identifier is disabled after a pre-defined time and allow the digital processor 302 to respond to request received through at least one corresponding identifier with a message. The purpose of responding with a message is to inform users and/or hosts that the at least one corresponding identifier are soon to be disabled. The reason to send message to respond to request, instead of sending message without receiving request, is to limit the proliferation of network traffic and maintain security. The message may be a string, an article, a paragraph, a binary file, a picture, a video, an audio message, a song, a web page, a SMS, an instant message, etc. The message may be sent using HTTP protocol, HTTPS protocol, SNMP protocol, FTP protocol, etc. According to one of the embodiments of the present invention, the message may inform users and hosts other available identifiers to use. Those of skilled in the art will readily appreciate other approaches to send the message and the contents of the message. The pre-defined time may last from 1 millisecond to days as the purpose is to allow users and hosts to have adequate time to decide what to do before the disablement of at least one corresponding identifier.

According to one of the embodiments of the present invention, when the corresponding identifiers are re-enabled, the corresponding identifiers may be broadcast. This allows users and hosts to be aware that the FWC has satisfied all conditions again through the at least one corresponding identifier. According to one of the embodiments of the present invention, digital processor 302 may determine not to broadcast the at least one corresponding identifier, such as not broadcasting SSIDs under 802.11 standard, also known as hidden SSIDs.

The invention claimed is:

1. A method for managing a network device, wherein said network device has a plurality of wide area network (WAN) interfaces, at least one wireless local area network (WLAN) interface, and at least one service set identifier (SSID) comprising:

monitoring WAN network connections in said plurality of WAN interfaces periodically;
receiving a request from a user through a first at least one corresponding SSID of a first WAN network connection, wherein the user sends the request for sending and receiving data through the network device using the first WAN network connection;
when the first WAN network connection does not meet at least one condition:
responding to the request by sending a message to the user; wherein the message is sent for the purpose of allowing users and hosts to have adequate time to perform necessary tasks before disabling the first at least one corresponding SSID; wherein the message contains information that the first at least one corresponding SSID is to be disabled after a predefined time; wherein the message also contains information of other available at least one SSID;
disabling the first at least one corresponding SSID of the first WAN network connection, wherein the first WAN network connection is one of said WAN network connections;
not broadcasting the first at least one corresponding SSID;
when the first WAN network connection meets all conditions:
enabling disabled first at least one corresponding SSID;
broadcasting the first at least one corresponding SSID, wherein a user of a first host is capable of selecting one of the first at least one corresponding SSIDs for connecting to the network device through a first WLAN connection associated with the first at least one corresponding SSID;
wherein the first host transmits and receives data through the Internet using the first WAN network connection;
wherein the at least one SSID corresponds to no WAN network connection, one WAN network connection, or a plurality of WAN network connection;
wherein determination of whether the first WAN network connection meets the at least one condition is based on (i) monitoring results of a particular WAN network connection, (ii) a combination of different selected WAN network connection monitoring results, or (iii) a logical operation performed on WAN network connection monitoring results observed in an aggregated WAN network connection.

2. The method of claim 1, wherein the message is selected from a group consisting of a web page, a string, an article, a paragraph, a binary file, a picture, a video, an audio message, a song, a short message service (SMS) message, an instant message.

3. The method of claim 1, further allowing network traffic belonging to one or more of the first at least one corresponding SSIDs to go through the first WAN network connection.

4. The method of claim 3, further comprising selecting one or more of the first at least one corresponding SSID for the step of disabling first at least one corresponding SSID based on a policy set by an administrator.

5. The method of claim 1, further comprising after disabling the one or more of the first at least one corresponding SSID checking periodically whether the first WAN network connection has met all conditions; wherein time period between the checking is predefined or according to an algorithm.

6. The method of claim 1, wherein the first at least one corresponding SSID is not broadcast, and becomes hidden SSID.

7. The method of claim 1, wherein the at least one condition is not met when all the selected WAN network connection monitoring results do not meet respective thresholds and if the at least one condition is based on the combination of different selected WAN network connection monitoring results.

8. The method of claim 1, wherein the at least one condition is not met when average of all WAN network connection monitoring results observed in first plurality of WAN network connections does not meet a threshold, wherein the first WAN network connection is an aggregated WAN network connection comprising a first plurality of WAN network connections, and if the at least one condition is based on a logical operation performed on WAN network connection monitoring results observed in the aggregated WAN network connection.

9. The method of claim 1, wherein the at least one condition is selected from a group consisting of: predefined download time of a predefined website or file, round trip time monitored after pinging a server, packet loss in a WAN network connection.

10. A wireless communication apparatus comprising a plurality of wide area network (WAN) interfaces, at least one wireless local area network (WLAN) interface, and at least one service set identifier (SSID), a digital processor, and data storage comprising program instructions executable by said digital processor to perform the operation of:
    monitoring WAN network connections in said plurality of WAN interfaces periodically;
    receiving a request from a user through a first at least one corresponding SSID of a first WAN network connection, wherein the user sends the request for sending and receiving data through the network device using the first WAN network connection;
    when the first WAN network connection does not meet at least one condition:
        responding to the request by sending a message to the user; wherein the message is sent for the purpose of allowing users and hosts to have adequate time to perform necessary tasks before disabling the first at least one corresponding SSID; wherein the message contains information that the first at least one corresponding SSID is to be disabled after a predefined time; wherein the message also contains information of other available at least one SSID;
        disabling the first at least one corresponding SSID of the first WAN network connection, wherein the first WAN network connection is one of said WAN network connections;
        not broadcasting the first at least one corresponding SSID;
    when the first WAN network connection meets all conditions:
        enabling disabled first at least one corresponding SSID;
        broadcasting the first at least one corresponding SSID, wherein a user of a first host is capable of selecting one of the first at least one corresponding SSIDs for connecting to the network device through a first WLAN connection associated with the first at least one corresponding SSID;
        wherein the first host transmits and receives data through the Internet using the first WAN network connection;
    wherein the at least one SSID corresponds to no WAN network connection, one WAN network connection, or a plurality of WAN network connection;
    wherein determination of whether the first WAN network connection meets the at least one condition is based on (i) monitoring results of a particular WAN network connection, (ii) a combination of different selected WAN network connection monitoring results, or (iii) a logical operation performed on WAN network connection monitoring results observed in an aggregated WAN network connection.

11. The wireless communication apparatus of claim 10, wherein the message is selected from a group consisting of a web page, a string, an article, a paragraph, a binary file, a picture, a video, an audio message, a song, a short message service (SMS) message, an instant message.

12. The wireless communication apparatus of claim 10, wherein program instructions executable by said digital processor to further perform the operation of:
    allowing network traffic belonging to one or more of the first at least one corresponding SSIDs to go through the first WAN network connection.

13. The wireless communication apparatus of claim 10, wherein program instructions executable by said digital processor to further perform the operation of: further comprising selecting one or more of the first at least one corresponding SSID for the step of disabling first at least one corresponding SSID based on a policy set by an administrator.

14. The wireless communication apparatus of claim 13, wherein program instructions executable by said digital processor to further perform the operation of: after disabling the one or more of the first at least one corresponding SSID checking periodically whether the first WAN network connection has met all conditions; wherein time period between the checking is predefined or according to an algorithm.

15. The wireless communication apparatus of claim 10, wherein the first at least one corresponding SSID is not broadcast, and becomes hidden SSID.

16. The wireless communication apparatus of claim 10, wherein the at least one condition is not met when all the selected WAN network connection monitoring results do not meet respective thresholds and if the at least one condition is based on the combination of different selected WAN network connection monitoring results.

17. The wireless communication apparatus of claim 10, wherein the at least one condition is not met when average of all WAN network connection monitoring results observed in first plurality of WAN network connections does not meet a threshold, wherein the first WAN network connection is an aggregated WAN network connection comprising a first plurality of WAN network connections, and if the at least one condition is based on a logical operation performed on WAN network connection monitoring results observed in the aggregated WAN network connection.

18. The method of claim 10, wherein the at least one condition is selected from a group consisting of: predefined download time of a predefined website or file, round trip time monitored after pinging a server, packet loss in a WAN network connection.

* * * * *